(12) United States Patent
Scott et al.

(10) Patent No.: US 8,126,484 B2
(45) Date of Patent: Feb. 28, 2012

(54) APPARATUS AND METHODS OF SHARING CONTACT INFORMATION BETWEEN MOBILE COMMUNICATION DEVICES USING SHORT MESSAGE SERVICE

(75) Inventors: Clifton Eugene Scott, San Diego, CA (US); Jason C. Baron, San Diego, CA (US); Michael Janacek Vines, San Diego, CA (US)

(73) Assignee: QUALCOMM, Incorporated, San Diego, CA (US)

( * ) Notice: Subject to any disclaimer, the term of this patent is extended or adjusted under 35 U.S.C. 154(b) by 743 days.

(21) Appl. No.: 11/691,289

(22) Filed: Mar. 26, 2007

(65) Prior Publication Data
US 2008/0242322 A1 Oct. 2, 2008

(51) Int. Cl.
*H04W 4/00* (2009.01)
*G06F 17/21* (2006.01)
(52) U.S. Cl. ........................... 455/466; 715/234
(58) Field of Classification Search ............... 455/412.1, 455/466; 715/513, 234
See application file for complete search history.

(56) References Cited

U.S. PATENT DOCUMENTS

| | | | |
|---|---|---|---|
| 7,770,102 B1 * | 8/2010 | Wolff et al. ................. | 715/234 |
| 2003/0236769 A1 | 12/2003 | Pyhalammi | |
| 2004/0249797 A1 | 12/2004 | Jarvinen et al. | |
| 2005/0059418 A1 * | 3/2005 | Northcutt ..................... | 455/517 |
| 2007/0038720 A1 * | 2/2007 | Reding et al. ................. | 709/217 |
| 2007/0053335 A1 | 3/2007 | Onyon et al. | |
| 2007/0149223 A1 * | 6/2007 | Liang .......................... | 455/466 |

OTHER PUBLICATIONS

Network Protocols Protocol Layers Iso Osi 7-layer protocol scheme from http://deneb.cs.kent. eduhmikhail/classes/aos.f02/102network2.Pdf.*
"How to make Outlook link to images on the web in HTML mail" Dec. 3, 2003 pp. 1-4.*
International Search Report-PCT/US08/058048—International Search Authority—European. Patent Office—Jul. 4, 2008.
Written Opinion—PCT/US08/058048—International Search Authority—European Patent Office—Jul. 4, 2008.
"Digital Cellular Telecommunications System (Phase 2+); Universal Mobile Telecommunications System (UMTS); Technical Realization of Short Message Service (SMS) 3GPP TS 23.040 Version 7.0.1 Release 7; ETSI TS 123 040," ETSI Standards, LIS, Sophia Antipolis Cedex, France, vol. 3-T2, No. V7.0.1, Mar. 1, 2007, XP014037705.
"Smart Messaging Specification—Revision 2.0.0." Smart Messaging Specification, XX, XX, May 17, 1999, XP002261432.

* cited by examiner

*Primary Examiner* — Dwayne Bost
*Assistant Examiner* — Joshua Schwartz
(74) *Attorney, Agent, or Firm* — Abdollah Katbab; Darren M. Simon

(57) ABSTRACT

Methods and devices are presented for sharing contact information amongst wireless communication devices using Short Message Service (SMS) communication. SMS transfer of contact information occurs seamlessly, in that the sender automatically generates and sends a SMS message(s) that includes the contact information upon designating a contact file for sharing and supplying a recipient identifier, such as the recipient phone number. On the recipient device end, receiving the contact information also may occur seamlessly, such that the contact information can be automatically stored in the recipient's phone book or, in some aspects, automatically stored in the recipient's phone book based a user setting or response.

31 Claims, 7 Drawing Sheets

APPARATUS AND METHODS OF SHARING CONTACT INFORMATION BETWEEN MOBILE COMMUNICATION DEVICES USING SHORT MESSAGE SERVICE

BACKGROUND

1. Field

The disclosed aspects relate to wireless communication devices, and more particularly, to apparatus and methods of sharing contact information amongst wireless communication devices using Short Message Service (SMS) communication.

2. Background

Wireless communication devices have become a prevalent means by which majorities of people worldwide have come to communicate. As the cost of such devices and the cost of the services related to such devices, such as cellular telephone services, decreases, the overall penetration of such devices among the general populous increases. No longer are wireless communication devices limited to business use and/or emergency communication, but rather they have become commonly used in all facets of life.

Most wireless communication devices include a large database of contacts, typically referred to as a contact listing or an address book. Each contact listing may have numerous personal data associated with the contact, such as contact name, contact telephone number, contact home or business address, electronic mail (email) address and the like. In many instances, a device user is able to place a communication call by accessing the contact entry in the contact listing, as opposed to manually inputting the contact's telephone number by keypad entry.

In most instances, the contact database is built over time by inputting received telephone numbers or placed telephone numbers, for example from call logs, and associating them with a name. Additionally, the contact database can be built by sharing contact information between wireless communication devices. Currently various methods are available for sharing contact information amongst wireless devices.

In some wireless communication devices, email is available as a means of communicating contact information between wireless devices. The contact database may allow for a user to select a contact file, format the file in a personal data exchange format and attach the file to an email. Upon receipt, the user of the recipient device can acknowledge the contact file attachment and choose to enter the contact information in the contact database of the recipient device. However, this sharing platform has limited penetration in the wireless communication device environment, such as the cellular telephone environment, because it requires both the contact sharing device and the recipient device to be equipped with access to another public network beyond the cellular network, such as the Internet or the like, in order to send and receive email.

Other currently available sharing techniques are limited in terms of sharing range. For example, wireless devices with Universal Serial Bus (USB) capability or the like allow for contact information to be exchanged between wireless devices or between a personal computer and a wireless device if the devices are physically connected via a cable. In another example, wireless devices that are equipped with Bluetooth® or Infrared Data Association (IrDA) communication capability are able to communicate contact information wirelessly, however, the range of such communication necessitates that the devices be in close proximity of one another in order for data transfer to occur.

Therefore a need exists to develop a contact sharing system for wireless communication device that provides a high level of device penetration in terms of capability. In addition, the desired system for should allow for contact sharing to occur regardless of the proximity of the wireless devices. Also, the desired system should be used user-friendly and should be able to be easily incorporated in pre-existing wireless communication devices.

SUMMARY

Present aspects provide for methods, devices, systems and computer program products for sharing contact information amongst wireless devices using Short Message Service (SMS) communication. SMS, otherwise referred to as text messaging, is widely available on most wireless communication devices and, as such, provides an ideal vehicle for sharing of contact information. By employing SMS communication to share contact information a greater populous of wireless device users will be able to enjoy the benefits of seamless sharing of contact information. Since SMS employs the cellular network for data exchange, contact information can be exchanged without regard to the proximity of the devices and without the need for physical connection.

In one aspect, a method is provided for communicating shared contact information between mobile communication devices. The method includes generating one or more Short Message Service (SMS) messages that each include at least a portion of a contact information file in a predetermined format operable to be recognizable as shared contact information by an SMS-receiving wireless communication device and communicating the one or more SMS messages to one or more predetermined wireless communication devices. In this regard, due to the limitations on the size of an SMS message it may be necessary to segment the contact information file before sending the file via SMS. Formatting of the contact information file may include implementing a personal data exchange format, such as vCard or the like, or using a message identifier associated with a wireless application platform, such BREW® (Binary Runtime Environment for Wireless®) available from Qualcomm Incorporated, of San Diego Calif. or the like.

In one specific aspect of the method, generating the SMS messages may involve providing a listing of user contact information files, receiving a user selection of a contact information file, receiving a user selection for sharing the selected contact information file with one or more wireless communication devices, and generating, automatically, one or more SMS messages that include at least a portion of the selected contact information file. In this regard, a device user may access a contact database, otherwise referred to as a phone book, address book, personal information manager or the like to view a listing of contacts stored in the database. The user may choose a contact from among the listing of contacts for sharing and, upon supplying an identifier, such as the telephone number of the wireless devices to whom sharing is desired, one or more SMS messages that include portion of the contact information file are automatically generated and communicated to the wireless communication device(s).

In another specific aspect of the method, generating the SMS message may involve receiving a text input for a SMS message that includes a contact information file entry, recognizing the entry as being included with a stored contact information file, generating a contact information share request based on recognition of the portion and receiving a user query for sharing the stored contact information file with one or more wireless communication devices. In this regard, a user may input an SMS message that includes a contact information file entry, such as a contact name, a contact telephone number, a contact email address or the like. The contact information file entry is recognized as being included within a stored contact listing, as such, the user may be provided with the option of sharing this contact information file with the designated recipient of the SMS message being generated. If the user chooses to share the contact information the text that includes the contact information file entry is identified, such as by highlighting, coloring, or the like, to allow the recipient of the SMS message to recognize that contact information related to the identified text (i.e., the contact information file entry) is available for acquisition.

Another aspect is defined by at least one processor configured to receive shared contact information at a wireless communication device. The processor includes a first module for generating one or more Short Message Service (SMS) messages that each include at least a portion of a contact information file in a predetermined format operable to be recognizable as shared contact information by an SMS-receiving wireless communication device, and a second module for communicating the one or more SMS messages to one or more predetermined wireless communication devices.

A computer program product provides for a further aspect. The computer program product includes a computer-readable medium that includes a first set of codes for causing a computer to generate one or more Short Message Service (SMS) messages that each include at least a portion of a contact information file in a predetermined format operable to be recognizable as shared contact information by an SMS-receiving wireless communication device and a second set of codes for causing a computer to communicating the one or more SMS messages to one or more predetermined wireless communication devices.

Another related aspect is defined by a wireless communication device that includes means for generating one or more Short Message Service (SMS) messages that each include at least a portion of a contact information file in a predetermined format operable to be recognizable as shared contact information by an SMS-receiving wireless communication device, and means for communicating the one or more SMS messages to one or more predetermined wireless communication devices.

A wireless communication device provides for another aspect. The device includes a computer platform including a processor and a memory and a Short Message Service application stored in the memory and executable by the processor. The SMS application is operable to generate one or more SMS messages that each include at least a portion of a contact information file in a predetermined format operable to be recognizable as shared contact information by an SMS-receiving wireless communication device. The wireless communication device also includes a communication module operable to communicate the one or more SMS messages to one or more predetermined wireless communication devices. In this regard, due to the limitations on the size of an SMS message it may be necessary to segment the contact information file before sending the file via SMS. Formatting of the contact information file may include implementing a personal data exchange format, such as vCard or the like, or using a message identifier associated with a wireless application platform, such as BREW® or the like.

The wireless communication device may additionally include a contact listing module, such as a phone book, address book, personal information manager or the like, operable to provide a listing of user contact information files, receive a user selection of a contact information file, receive a user selection for sharing the selected contact information file with one or more wireless communication devices and prompt the SMS application to automatically generate one or more SMS messages that include at least a portion of the selected contact information file. The contact listing module may additionally be operable to receive a user selection of one or more wireless communication devices for sharing the selected contact information file. The one or more wireless communication devices designated for sharing of contact information file may be defined by and selected by an identifier, such as associated telephone number.

The SMS application may additionally be operable to receive a text input for a SMS message that includes a portion of a contact information file, recognize the portion as being associated with a stored contact information file, generate a contact information share request based on recognition of the portion and receive a user query for sharing the stored contact information file with one or more wireless communication devices. The contact information file entry may include, but is not limited to, a contact name, a contact telephone number, a contact street address, and a contact email address. In response to the SMS application receiving a request for sharing the stored contact information file, the SMS application may additionally be operable to automatically generate one or more SMS messages that include at least a portion of the selected contact information file, such that the contact information file is communicated to the designated share recipients via SMS.

Another aspect is defined by a method for receiving shared contact information at a wireless communication device. The method includes receiving one or more Short Message Service (SMS) messages that include at least a portion of a contact information file, automatically recognizing that the one or more SMS messages include at least a portion of a contact information file and storing the contact information file in a contact database. The method may further include providing a user interface for requesting user-approval prior to storing the contact information file in the contact database. In some aspects, due to the limitations on size of SMS communications, receiving one or more SMS messages may include receiving two or more messages such that each message includes a separate portion of the contact information file. In such aspects, the method may further include aggregating the separate portions of the contact information file to form the contact information file prior to storing the contact information file in the database. In some aspects, automatically recognizing that the one or more SMS messages include at least a portion of a contact information file may entail recognizing that the one or more SMS messages are in personal data exchange file format, such as vCard format or recognizing a contact information identifier associated with a wireless communication device-application development platform, such as BREW® or the like.

A related aspect is provided for by at least one processor configured to receive shared contact information at a wireless communication device. The processor includes a first module for receiving one or more Short Message Service (SMS) messages that include at least a portion of a contact information file, a second module for automatically recognizing that the one or more SMS messages include at least a portion of a contact information file and a third module for storing the contact information file in a contact database.

Another related aspect is provided for by a computer program product. The computer program product includes a computer-readable medium that includes a first set of codes for causing a computer to receive one or more Short Message Service (SMS) messages that include at least a portion of a contact information file, a second set of codes for causing a computer to automatically recognize that the one or more SMS messages include at least a portion of a contact information file and a third set of codes for causing a computer to store the contact information file in a contact database.

A further related aspect is defined by a wireless communication device including means for receiving one or more Short Message Service (SMS) messages that include at least a portion of a contact information file, means for automatically recognizing that the one or more SMS messages include at least a portion of a contact information file and means for storing the contact information file in a contact database.

According to another aspect, a wireless communication is defined. The wireless communication device includes a computer platform including a processor and a memory. The device also includes a communication module operable to receive one or more Short Message Service (SMS) messages that include at least a portion of a contact information file and a SMS application stored in the memory and executable by the processor. The SMS application is operable to automatically recognize that the one or more SMS messages include at least a portion of a contact information file and to store the contact information file in a contact database. The SMS application may additionally a user interface for requesting user-approval prior to storing the contact information file in the contact database. Additionally, in those aspects in which size limitations for SMS communication dictate that the contact information file be communicated via multiple SMS messages, the SMS application may include an aggregator operable for aggregating two or more SMS messages that each includes at least a portion of a contact information file. The SMS application may recognize that the SMS messages include contact information file data based on the file format, such as a personal data exchange file format or a contact information identifier associated with a wireless communication device-application development platform, such as BREW® or the like.

Thus, present aspects provide for methods and devices for sharing contact information amongst wireless communication devices using Short Message Service (SMS) communication. SMS transfer of contact information may occur seamlessly, in that the sharing device automatically generates and sends a SMS message(s) that includes the contact information upon receiving a designated a contact for sharing and receiving a recipient designator, such as the recipient phone number. On the recipient device end, receiving the contact information also occurs seamlessly, such that the contact information is automatically stored in the contact list of the recipient device or, in some aspects, automatically stored in the contact list based on a user setting or response. Since SMS communication is prevalent amongst the majority of wireless communication devices in the market, the present aspects provide for a greater degree of device penetration as compared to other methods that utilize other types of communication networks. Additionally, since SMS communication utilizes the wireless communication network, sharing of contact information is not limited in geographic range to close proximity sharing, but can be shared across the range of the wireless network.

BRIEF DESCRIPTION OF THE DRAWINGS

The disclosed aspects will hereinafter be described in conjunction with the appended drawings, provided to illustrate and not to limit the disclosed aspects, wherein like designations denote the elements, and in which.

DETAILED DESCRIPTION

The present devices, apparatus, methods, computer-readable media and processors now will be described more fully hereinafter with reference to the accompanying drawings, in which aspects of the invention are shown. The devices, apparatus, methods, computer-readable media and processors, however, may be embodied in many different forms and should not be construed as limited to the aspects set forth herein; rather, these aspects are provided so that this disclosure will be thorough and complete, and will fully convey the scope of the invention to those skilled in the art. Like numbers refer to like elements throughout.

The various aspects for sharing contact information via Short Message Service (SMS) communication are described herein in connection with a wireless communication device. A wireless communication device can also be called a subscriber station, a subscriber unit, mobile station, mobile, remote station, access point, remote terminal, access terminal, user terminal, user agent, a user device, or user equipment. A wireless communication device may be a cellular telephone, a cordless telephone, a Session Initiation Protocol (SIP) phone, a wireless local loop (WLL) station, a personal digital assistant (PDA), a handheld device having wireless connection capability, or other processing device connected to a wireless modem.

The described aspects provide for methods, apparatus and computer program products for sharing contact information amongst wireless communication devices using Short Message Service (SMS) communication. SMS is a store-and-forward message service available on many second-generation and all third-generation wireless networks that allows users to send and receive short text messages over wireless devices. Since SMS communication is prevalent amongst the majority of wireless communication devices in the market, the present aspects provide for a greater degree of device penetration as compared to other methods that utilize other types of communication. Additionally, since SMS communication utilizes the wireless network, sharing of contact information is not limited in geographic range to close proximity sharing, but can be shared across the range of the wireless network. By implementing SMS communication, contact information can be shared amongst wireless communication devices seamlessly, in this regard, the users of the wireless communication devices may be unaware that SMS is the communication vehicle for the contact information.

Figure 1:
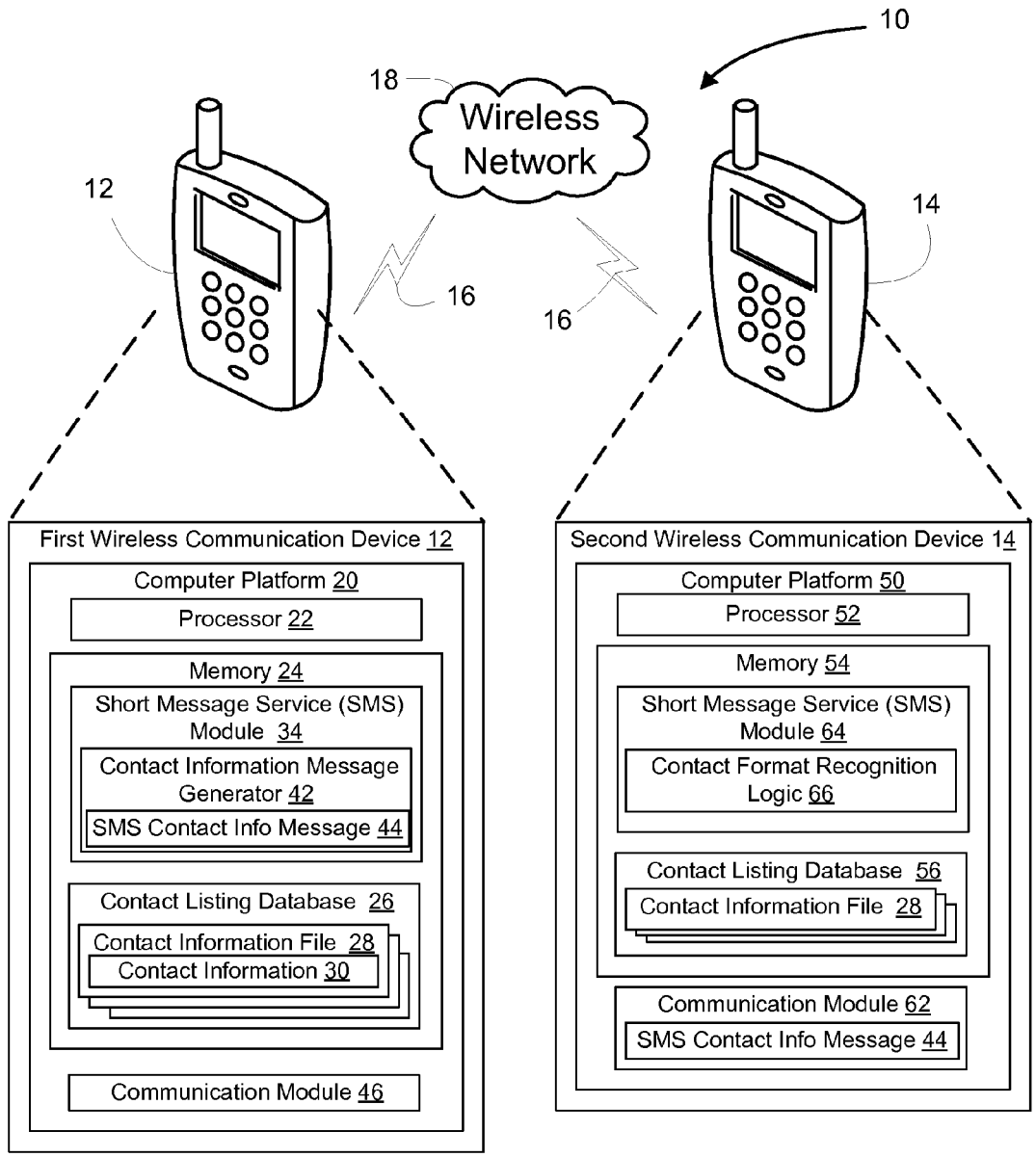
FIG. 1 is a block diagram representation of a system for sharing contact information between wireless communication devices using Short Message Service (SMS) communication, according to an aspect.

Referring to FIG. 1, a block diagram is provided for a system for sharing contact information between wireless communication devices using SMS communication. The system 10 includes a first wireless communication device 12, also referred to as the sharing device, and a second wireless communication device 14, also referred to as the contact recipient device. The first and second wireless communication device 12, 14 are in wireless communication 16 via wireless network 18, which provides for SMS communication. It should be noted that while the first wireless communication device 12 is discussed in terms of sharing contact information and the second wireless communication device 14 is discussed in terms of receiving the shared contact information, in most instances, the first and second wireless devices are capable of both sending and receiving contact information via SMS. Thus, the first wireless communication device 12 will typically include similar hardware, apparatus, modules and/or logic as the second wireless communication device 14 to allow for receiving shared contact information and the second wireless communication device 14 will typically include similar hardware, apparatus, modules and/or logic as the first wireless communication device 12 to allow for sharing/communicating contact information.

The first wireless communication device 12 includes a computing platform 20 having a processor 22 and a memory 24. The memory includes contact information database 26, such as a phonebook, contact list, address book, personal information manager or the like, that includes a plurality of contact information files 28, such as listings of contacts. Each contact information file 28 includes contact information 30, such as one or any combination of related information, including name, home and/or work and/or mobile telephone number, facsimile (fax) number, electronic mail (email) address, home address, business address, personal data, web page/URL address, other digital addresses and the like. The device user may receive contact information electronically from other communication devices or the device user may manually enter contact information into files.

The memory 24 includes SMS module 32, which is typically operable to allow a user a platform to input a short message, commonly referred to as a text message, and to communicate the short message to one or more identified wireless communication devices. In disclosed aspects the SMS module 32 may include a contact information message generator 42 operable to generate an SMS message 44 that includes the contact information 30 from the selected file 28. In some aspects, the contact information message generator 42 will automatically generate the SMS message 44, such as when prompted by any module or application. The contact information message generator 42 will be operable to generate the message in a predetermined format that provides for the recipient device(s) to automatically recognize that the message includes contact information. For example, the contact information message generator 42 may be operable to format the message 44 in a standard personal data exchange format, such as vCard format or the like. In another example, the contact information message generator 42 may format the message 44 with a contact information identifier, typically located in a message header, that is recognizable to the SMS module of the recipient device or a wireless communication device-application development platform, such as BREW® (Binary Runtime Environment for Wireless®) available from Qualcomm Incorporated, of San Diego Calif. or the like. In this regard, contact information message generator 42 generates SMS message 44 in any format that provides for the recipient wireless communication device(s) to automatically recognize that the SMS message 44 includes contact information, as opposed to being a conventional or non-contact information bearing text message.

The computer platform 20 additionally includes communication module 46 that is operable for sending and receiving wireless communications across a wireless network, such as wireless network 18. In disclosed aspects, communication module 46 is operable for communicating the SMS messages that include contact information to the designated recipient wireless communication devices.

The system 10 of FIG. 1 also includes second wireless communication device 14 that serves as a designated recipient device for receiving the shared contact information. The second wireless communication device 14 includes a computing platform 50 having a processor 52 and a memory 54. The memory includes contact information database 56, such as a phonebook, contact list, address book, personal information manager or the like, that includes a plurality of contact information files 28, such as listings of contacts.

The computer platform additionally includes communication module 62 that is operable for sending and receiving wireless communications across a wireless network, such as wireless network 18. In disclosed aspects, communication module 62 is operable for receiving wireless communication of the SMS messages 44 that include contact information and communicating the SMS message 44 to the SMS module 64.

Memory 54 includes SMS module 64 that is typically operable to provide the user with an interface, such as windowed display, for communicating the SMS message. In the disclosed aspects, the SMS module 64 includes contact format recognition logic 66 operable to recognize the format of the SMS message 44 as a predetermined format associated with contact information. As previously noted, the SMS message 44 will be formatted so as to be recognizable as including contact information. For example, the contact format recognition logic 66 may be operable to recognize a personal data exchange format, such as vCard or a contact information identifier, typically located in a message header. In some aspects, the contact information identifier may be recognizable to SMS module 64 and/or a wireless communication device-application development platform, such as BREW®.

Figure 2:
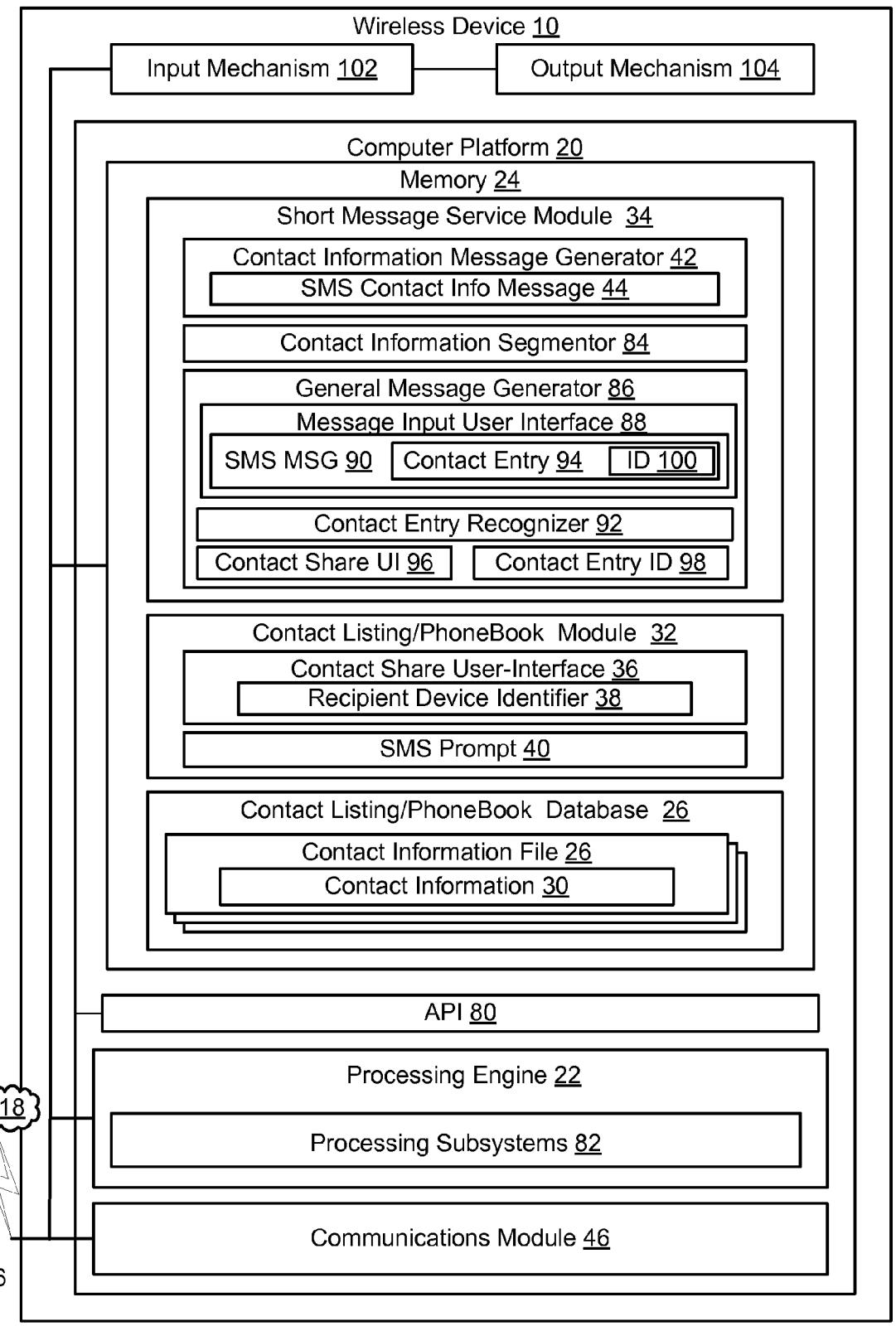
FIG. 2 is a detailed block diagram of a wireless communication device operable for sharing contact information with other wireless communication devices using SMS communication, according to an aspect.

Referring to FIG. 2, according to one aspect, a detailed block diagram representation of first wireless communication device 12 is depicted. The wireless communication device 12 may include any type of computerized, communication device, such as cellular telephone, Personal Digital Assistant (PDA), two-way text pager, portable computer, and even a separate computer platform that has a wireless communications portal, and which also may have a wired connection to a network or the Internet. The wireless communication device can be a remote-slave, or other device that does not have an end-user thereof but simply communicates data across the wireless network, such as remote sensors, diagnostic tools, data relays, and the like. The present apparatus and methods for sharing contact information using SMS can accordingly be performed on any form of wireless communication device or wireless computer module, including a wireless communication portal, including without limitation, wireless modems, PCMCIA cards, access terminals, desktop computers or any combination or sub-combination thereof.

The wireless communication device 12 includes computer platform 20 that can transmit data across a wireless network, and that can receive and execute routines and applications. Computer platform 20 includes memory 24, which may comprise volatile and nonvolatile memory such as read-only and/or random-access memory (RAM and ROM), EPROM, EEPROM, flash cards, or any memory common to computer platforms. Further, memory 24 may include one or more flash memory cells, or may be any secondary or tertiary storage device, such as magnetic media, optical media, tape, or soft or hard disk.

Further, computer platform 20 also includes processor 22, which may be an application-specific integrated circuit ("ASIC"), or other chipset, processor, logic circuit, or other data processing device. Processor 22 or other processor such as ASIC may execute an application programming interface ("API") layer 80 that interfaces with any resident programs, such as SMS module 34 and contact listing module 32, stored in the memory 24 of the wireless device 12. API 80 is typically a runtime environment executing on the respective wireless device. One such runtime environment is Binary Runtime Environment for Wireless® (BREW®) software developed by Qualcomm, Inc., of San Diego, Calif. Other runtime environments may be utilized that, for example, operate to control the execution of applications on wireless computing devices.

Processor 22 includes various processing subsystems 82 embodied in hardware, firmware, software, and combinations thereof, that enable the functionality of communication device 12 and the operability of the communication device on a wireless network. For example, processing subsystems 82 allow for initiating and maintaining communications, and exchanging data, with other networked devices. In aspects in which the communication device is defined as a cellular telephone the communications processor 22 may additionally include one or a combination of processing subsystems 58, such as: sound, non-volatile memory, file system, transmit, receive, searcher, layer 1, layer 2, layer 3, main control, remote procedure, handset, power management, digital signal processor, messaging, call manager, Bluetooth® system, Bluetooth® LPOS, position engine, user interface, sleep, data services, security, authentication, USIM/SIM, voice services, graphics, USB, multimedia such as MPEG, GPRS, etc (all of which are not individually depicted in FIG. 2 for the sake of clarity). For the disclosed aspects, processing subsystems 82 of processor 22 may include any subsystem components that interact with the SMS module 34 and Contact Listing Module 32.

The memory 24 of computer platform 20 includes contact listing database 26 such as a contact phonebook, contact list, address book, personal information manager or the like, that includes a plurality of contact information files 28, such as a listing of the contacts. The contact information files 28 include contact information 30, such as one or any combination of related information, including name, home and/or business and/or mobile telephone number, fax number, electronic mail (email) address, home address, business address, personal data, web page/URL address, other digital addresses and the like.

The memory of 24 of computer platform 20 also includes a contact listing module 32, which is operable to provide user access to the contact listing database 26. The contact listing module 32 may be a standalone application or the module may be accessible to the user through other communication applications, such as Short Message Service (SMS) module 34, a Voice Message Service (VMS) module (not shown in FIG. 2), an email module (not shown in FIG. 2 or the like). The contact listing module 32 includes a contact share user interface 36 that is operable to allow the user to select one or more information contact files 28 for sharing and to identify the recipient(s) of the selected contact information files 28 by inputting or selecting one or more recipient wireless device identifiers 38, such as the recipient device's telephone numbers. The wireless device identifier may be any identifier that is used by the SMS module 34 to identify the wireless device to which SMS messages are to be sent. The contact listing module also may include an SMS prompt 40 that is operable to prompt the SMS module 34 for generating an SMS message, once a user has selected one or more contact information files 28 for sharing and has identified the recipients through input/selection of recipient wireless device identifiers 38. Prompting the SMS module 34 includes communicating to the SMS module 34, the contact information 30 from the selected files(s) 28 and the one or more recipient wireless device identifiers 38.

As noted, the memory 24 of computer platform 20 also includes SMS module 32 that is typically operable to allow a user a platform to input a short message, commonly referred to as a text message, and to communicate the short message to one or more identified wireless communication devices. In disclosed aspects the SMS module 32 may include a contact information message generator 42 operable to generate a SMS message that includes the contact information 30 from the selected files 28. In some aspects, the contact information message generator 42 will automatically generate the SMS messages 44, such as when prompted by the contact listing module 32 or any other module or application. Automatic generation and communication of the contact information message provides for seamless sharing of the contact information between the wireless devices. As such, once a user selects a contact information file for sharing, the SMS module 34 may be automatically launched to automatically generate and communicate the contact SMS contact information message 44. In this regard, the sharing user may be unaware that SMS is being used as the communication vehicle for sharing the contact information.

The SMS module 34 may also include a contact information segmentor 84 operable for segmenting the contact information 30 in the contact information file 28 into two or more segments. SMS communication is generally limited in terms of the size of the message that may be communicated and, as such, sharing of contact file information may include communication of multiple SMS messages, with each message including one of the segmented portions of the file. It should be noted that while the contact information segmentor 84 is illustrated and described in relation to the SMS module, it may be implemented anywhere within memory 24, such as within contact listing module 32 or the like. Additionally, in alternate aspects, segmentation may occur after the SMS contact information message 44 has been generated prior to communicating/sharing the contact information with the designated recipient device(s). In those aspects in which segmentation of the contact information is utilized, the messages may include a segment identifier and/or a sequence identifier, such as header flags, that are operable to identify the SMS message as a segment of a contact information file and provide the proper sequence number for aggregating the contact information file upon receipt.

The contact information message generator 42 will be operable to generate the message in a predetermined format that provides for the recipient device(s) to automatically recognize that the message includes contact information. For example, the contact information message generator 42 may be operable to format the message 44 in a standard personal data exchange format, such as vCard format or the like. In another example, the contact information message generator 42 may format the message 44 with a contact information identifier, typically a header flag. In some aspects, the contact information identifier may be recognizable to SMS module 64 and/or to a wireless communication device-application development platform, such as BREW® or the like. In this regard, contact information message generator 42 generates SMS message 44 in any format that provides for the recipient wireless communication device(s) to automatically recognize that the SMS message 44 includes contact information, as opposed to being a conventional or non-contact information bearing text message.

In an alternative aspect, the SMS module may be operable to recognize a contact entry in a conventional user-inputted SMS message. The recognized contact entry is associated with a corresponding entry in a stored contact information file. Recognition of the contact entry may prompt a user query to determine whether sharing of the associated contact information file is desired. If the user desires to share the associated contact information file, the contact entry in the SMS message is identified as being associated with shared contact information and sharing of the contact information file is provided. In this regard, the SMS module 34 includes a general message generator 86 operable to provide a user with a message interface 88 for inputting the text for a SMS message 90. The general message generator 86 may include a contact entry recognizer 92 operable for recognizing inputted text as a contact entry 94, e.g. all or a portion of the data associated with contact information 30, in a stored contact information file 28. For example, if the user types, or otherwise inputs, a stored contact name, stored contact telephone number, stored contact email address or the like, in the body of the SMS message, the contact entry recognizer 88 will determine that the input is associated with a stored one of the contact information 30, and prompt the user if attachment of the associated contact information 30 is desired.

In this alternate aspect, the general message generator 86 may also include a contact share user-interface 96 operable for providing a contact information share option to the user upon recognition of the contact entry 94. For example, if a user inputs the telephone number of a stored contact, the module will recognize the telephone number as an entry 94 within a stored contact information file 28 and provide the user with contact share user-interface 96, such as a display window, which provides the user the option of sharing the contact information with the recipient of the SMS message 90 being generated by the user. The general message generator 86 may also include contact entry identifier 98 that is operable for providing identifier (ID) 100 to the contact entry 94 in the SMS message 90 to identify the entry as being associated with a shared contact information file. Identification 100 of the contact entry 94 is implemented, if the user chooses to share the contact information file 28 associated with the contact entry 94. The ID 100 may be an identifier in the message header that provides for automatic recognition that the contact entry 94 has an associated shared contact file 28. Alternatively, ID 100 may highlight the contact entry, for example, bold type, underline, italicize, or otherwise visually identify the contact entry as being associated with a shared contact information, so that the recipient of the SMS message 90 can recognize that the contact entry has an associated contact information file and perform the necessary action to obtain and store the contact information file 28. In some aspects, the ID 100 may further provide for a link embedded within contact entry 94 that provides for the contact information file 28 to be obtained from a network resource, such as a network server or obtained locally based on previous receipt of SMS contact information message 44.

In some aspects of the alternate aspect, once the user has indicated a desire to share the contact information file 28 associated with the contact entry 94, the contact information file 28 may be communicated to the contact information message generator 42 and SMS contact information message 44 may be automatically generated and communicated to the recipient of the general SMS message 90. In this regard, the recipient of the general SMS message 90 receives multiple SMS messages: the general SMS text message 90 that includes the contact entry 94 and identifier 100 and one or more SMS contact information messages 44 that include portions or the entirety of the contact information file 28.

Computer platform 20 additionally includes communications module 46 embodied in hardware, firmware, software, and combinations thereof, that enables communications among the various components of the wireless communication device 12, as well as between the communication device 12 and wireless network 18. In described aspects, the communication module 46 enables the communication of all SMS correspondence between wireless communication device 12, the wireless network 18 and the devices receiving the SMS communications, for example second wireless communication device 14 of FIG. 2. The communication module 46 may include the requisite hardware, firmware, software and/or combinations thereof for establishing a wireless network communication connection.

Additionally, wireless communication device 12 has input mechanism 102 for generating inputs into communication device, and output mechanism 104 for generating information for consumption by the user of the communication device. For example, input mechanism 102 may include a mechanism such as a key or keyboard, a mouse, a touch-screen display, a microphone, etc. In certain aspects, the input mechanisms 102 provide for user input to interface with an application, such as contact listing module 32 and SMS module 34. Further, for example, output mechanism 104 may include a display, an audio speaker, a haptic feedback mechanism, etc. In the illustrated aspects, the output mechanism 104 may include a display operable to display Message input UI 88, contact share UI 36, contact share UI 96 and the like.

Figure 3:
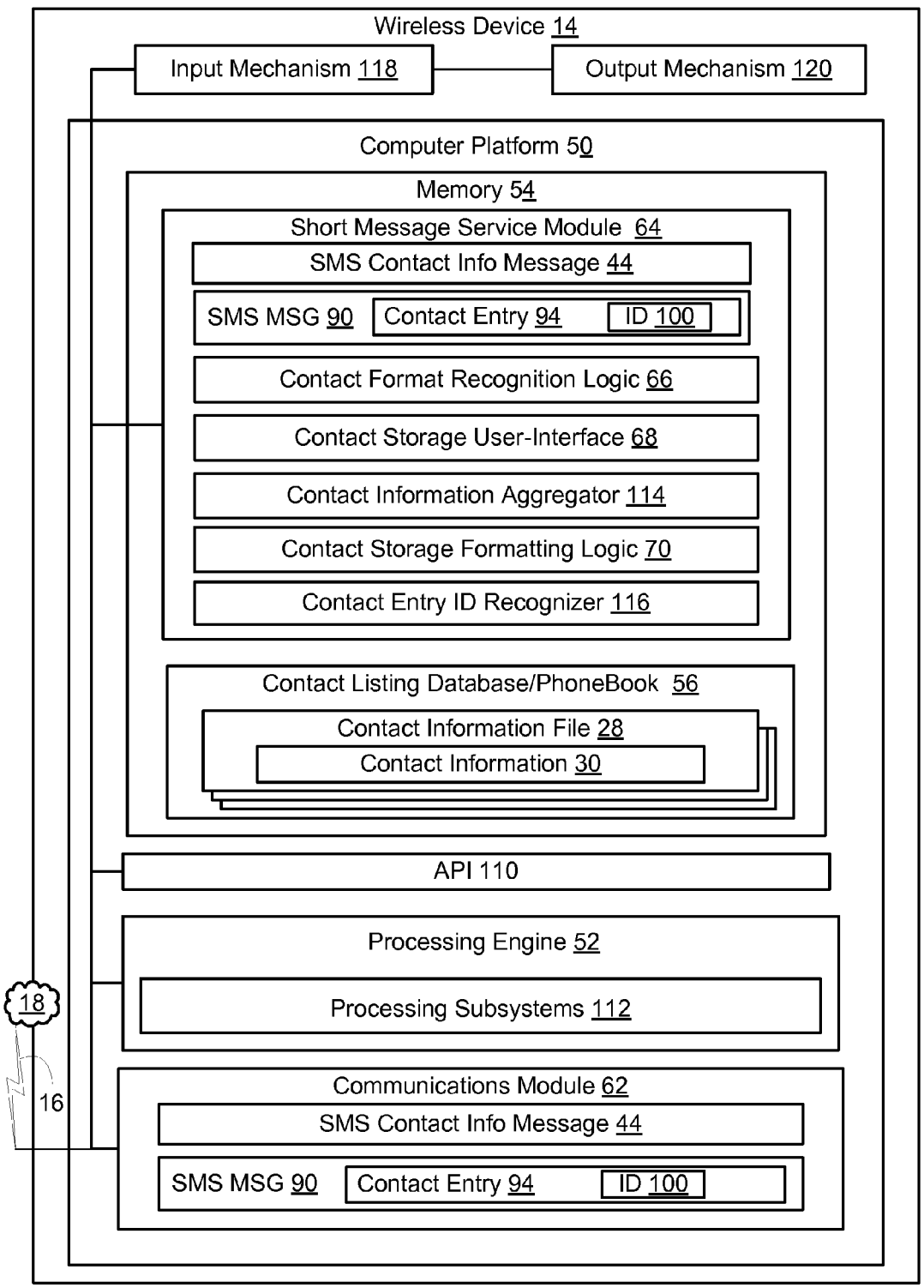
FIG. 3 is a detailed block diagram of a wireless communication device operable for receiving shared contact information from another wireless communication device via SMS communication, according to another aspect.

Referring to FIG. 3, according to one aspect, a detailed block diagram representation of second wireless communication device 14 is depicted. Similar to first wireless communication device 12, second wireless communication device 14 may include any type of computerized, communication device, such as cellular telephone, Personal Digital Assistant (PDA), two-way text pager, portable computer, and even a separate computer platform that has a wireless communications portal, and which also may have a wired connection to a network or the Internet. The present apparatus and methods for receiving shared contact information using SMS can accordingly be performed on any form of wireless communication device or wireless computer module, including a wireless communication portal, including without limitation, wireless modems, PCMCIA cards, access terminals, desktop computers or any combination or sub-combination thereof.

The wireless communication device 14 includes computer platform 20 that can transmit data across a wireless network, and that can receive and execute routines and applications. Computer platform 50 includes memory 54, which may comprise volatile and nonvolatile memory such as read-only and/or random-access memory (RAM and ROM), EPROM, EEPROM, flash cards, or any memory common to computer platforms. Further, memory 54 may include one or more flash memory cells, or may be any secondary or tertiary storage device, such as magnetic media, optical media, tape, or soft or hard disk.

Further, computer platform 50 also includes processor 52, which may be an application-specific integrated circuit ("ASIC"), or other chipset, processor, logic circuit, or other data processing device. Processor 52 or other processor such as ASIC may execute an application programming interface ("API") layer 110 that interfaces with any resident programs, such as SMS module 64, stored in the memory 54 of the wireless device 14. API 110 is typically a runtime environment executing on the respective wireless device, for example BREW® or other runtime environments may be utilized that, for example, operate to control the execution of applications on wireless computing devices.

Processor 52 includes various processing subsystems 112 embodied in hardware, firmware, software, and combinations thereof, that enable the functionality of communication device 14 and the operability of the communication device on a wireless network 18. For example, processing subsystems 112 allow for initiating and maintaining communications, and exchanging data, with other networked devices. For the disclosed aspects, processing subsystems 112 of processor 52 may include any subsystem components that interact with the SMS module 64.

The memory 54 of computer platform 50 includes contact listing database 56 such as a contact phonebook, contact list, address book, personal information manager or the like, that includes a plurality of contact information files 28, such as a listing of contacts. The contact information files 28 include contact information 30, such as one or any combination of related information, including name, home and/or business and/or mobile telephone number, fax number, electronic mail (email) address, home address, business address, personal data, web page/URL address, other digital addresses and the like.

The computer platform additionally includes communication module 62 that is operable for sending and receiving wireless communications across a wireless network, such as wireless network 18. In disclosed aspects, communication module 62 is operable for receiving wireless communication of the SMS contact information messages 44 and SMS messages 90 that include a contact entry 94 having an identifier 100 and communicating the SMS contact information message 44 and the SMS message 90 to the SMS module 64.

Memory 54 includes SMS module 64 that is operable to generate and receive SMS messages. In the disclosed aspects, the SMS module 64 includes contact format recognition logic 66 operable to recognize the predetermined format of the SMS contact information message 44 as a format that is associated with contact information 30. As previously noted, the SMS contact information message 44 will be formatted so as to be recognizable as including contact information 30. For example, the contact format recognition logic 66 may be operable to recognize a personal data exchange format, such as vCard or a contact information identifier, typically message header flag or the like. In some aspects, contact information may be recognizable to a wireless communication device-application development platform, such as the BREW® Platform.

The SMS module 64 may additionally include contact storage user interface 68 operable for providing a user with an interface, such as a windowed display, for communicating that a contact information file 28 has been received and asking the user if they desire to store the contact information file 28 in contact listing database 56. In alternate aspects, contact storage user interface 68 may be omitted or configurable by the user to allow to be set in an automated mode, thereby, providing for received SMS messages that include contact information to be automatically communicated to and stored in contact listing database 56. If the user chooses not to store the contact information file 28, the SMS message(s) 44 may be deleted or temporarily stored in the SMS module 64.

The SMS module 64 may also include a contact information aggregator 114 operable for aggregating segments of the contact information file 28 into an entire contact information file 28. As previously noted, SMS communication is generally limited in terms of the size of the message that may be communicated and, as such, sharing of contact file information may utilize communication of multiple SMS messages, with each message including one of the segmented portions of the file. The contact information aggregator 114 may additionally be operable for identifying the SMS contact info message 44 as including a segment of a contact information file 28 and identifying a sequence number associated with the file 28. It should be noted that while the contact information aggregator 114 is illustrated and described in relation to the SMS module, it may be implemented anywhere within memory 24 or the communication module 62. Additionally, in alternate aspects, aggregation may occur prior to or after the contact information has been formatted in an appropriate contact storage format.

The SMS module 64 may additionally include contact storage formatting logic 70 that is operable for formatting the received contact information 30 in a proper format suitable for storage in contact listing database 56. For example, if the received contact information SMS message is formatted in a personal data exchange format, such as vCard or the like, which is not compatible with the format of the resident contact listing database 56, then the contact storage formatting logic 70 may operate to reformat the contact information 30 into a new, compatible format prior to storing the contact information in contact listing database 56. As such, contact storage formatting logic 70 may include one or more algorithms or any mechanism operable to translate content information from a first format to a second format.

In alternate aspects in which wireless communication device 14 is operable to receive SMS messages 90 that include a contact entry 94 having an associated ID 100, the SMS module 64 may include contact entry ID recognizer 116 operable for automatically recognizing that the identified contact entry is associated with a shared contact information file 28. Recognition of the contact entry ID 100 may prompt the SMS module to launch contact storage user-interface 68 operable for notifying the user that a contact information file 28 has been received and asking the user if they desire to store the contact information file 28 in contact listing database 56. Alternatively, the contact entry ID 100 may be a visual ID that is recognizable to the user as being associated with a contact information file 28. Upon recognition of ID 100 the user may provide a device input, such as activating a link embedded in the contact entry or the like, to direct the SMS module to store the contact information file 28 in contact listing database 56 or to acquire the contact information file 28 from the sharing wireless communication device 12 or another network entity, such as a network server and, subsequently, store the contact information file 28 in contact listing database 56.

Additionally, wireless communication device 14 has input mechanism 118 for generating inputs into communication device, and output mechanism 120 for generating information for consumption by the user of the communication device. For example, input mechanism 118 may include a mechanism such as a key or keyboard, a mouse, a touchscreen display, a microphone, etc. In certain aspects, the input mechanisms 118 provides for user input to interface with an application, such as SMS module 64. Further, for example, output mechanism 120 may include a display, an audio speaker, a haptic feedback mechanism, etc. In the illustrated aspects, the output mechanism 120 may include a display operable to display SMS message 90.

Figure 4:
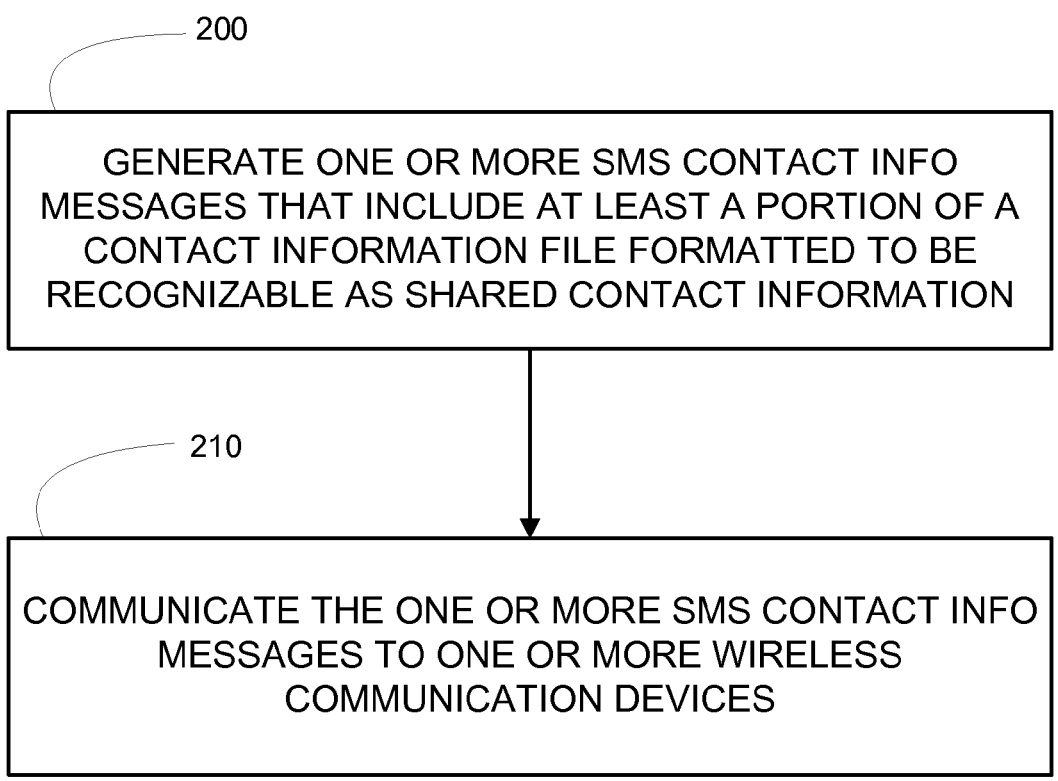
FIG. 4 is a flow diagram of a method for sharing contact information amongst wireless communication devices using SMS, according to yet another aspect.

Referring to FIG. 4, a flow diagram is shown that depicts a method for sharing contact information between wireless communication devices using Short Message Service (SMS), according to an aspect. At Event 200, a wireless communication device generates one or more SMS contact information messages that include at least a portion of a contact information file. SMS communication is limited in terms of the size of the message that can be communicated and, therefore, in some aspects, communicating contact information files may include segmenting the file prior to SMS communication when the overall size of the contact information file exceeds the SMS size limit. In the case of a segmented contact information file, each segmented portion can be included in a separate SMS message, and the segmented portions can be identified, either as being a part of a segmented file or as being associated with a given contact, for rejoining into a contact information file. In use, once the multiple SMS contact information messages are received at a designated wireless device, the segmented messages will be properly sequenced and aggregated to form the contact information file prior to storing the file in a contact listing database.

The SMS contact information file(s) are generated in a predetermined format to be recognizable as shared contact information by the wireless communication device or devices that are designated to receive the SMS contact information message(s). For example, in some aspects, the SMS contact information files may be formatted in a personal data exchange format, such as vCard or the like, which may then be recognized by the receiving device as contact information as opposed to a standard SMS message. In other aspects, the SMS contact information message(s) may be formatted to be recognizable by a wireless application platform, such as the BREW® platform or the like. In some aspects, an identifier or flag in the message header may be added to identify the message as including contact information, as opposed to being a conventional or a non-contact information-bearing text message. It is noted that any format that provides for the designated receiving wireless device to recognize the SMS message as including contact information suitable for storage in a contact listing database is within the confines of the present aspects.

At Event 210, the one or more SMS contact information messages are communicated to one or more predetermined wireless communication devices. In most aspects, the user will select one or more wireless communication devices to share the contact information with the user of the selected devices. Typically, selection of one or more wireless devices will involve input or selection of a device identifier, such as a device telephone number, which serves as the address for SMS communication, although other methods could be utilized to define the recipient. While in some aspects, SMS communication may be limited to one-to-one communication, in other aspects, it may be feasible to configure the SMS system to provide for communication/sharing of the SMS contact information messages with more than one device.

Figure 5:
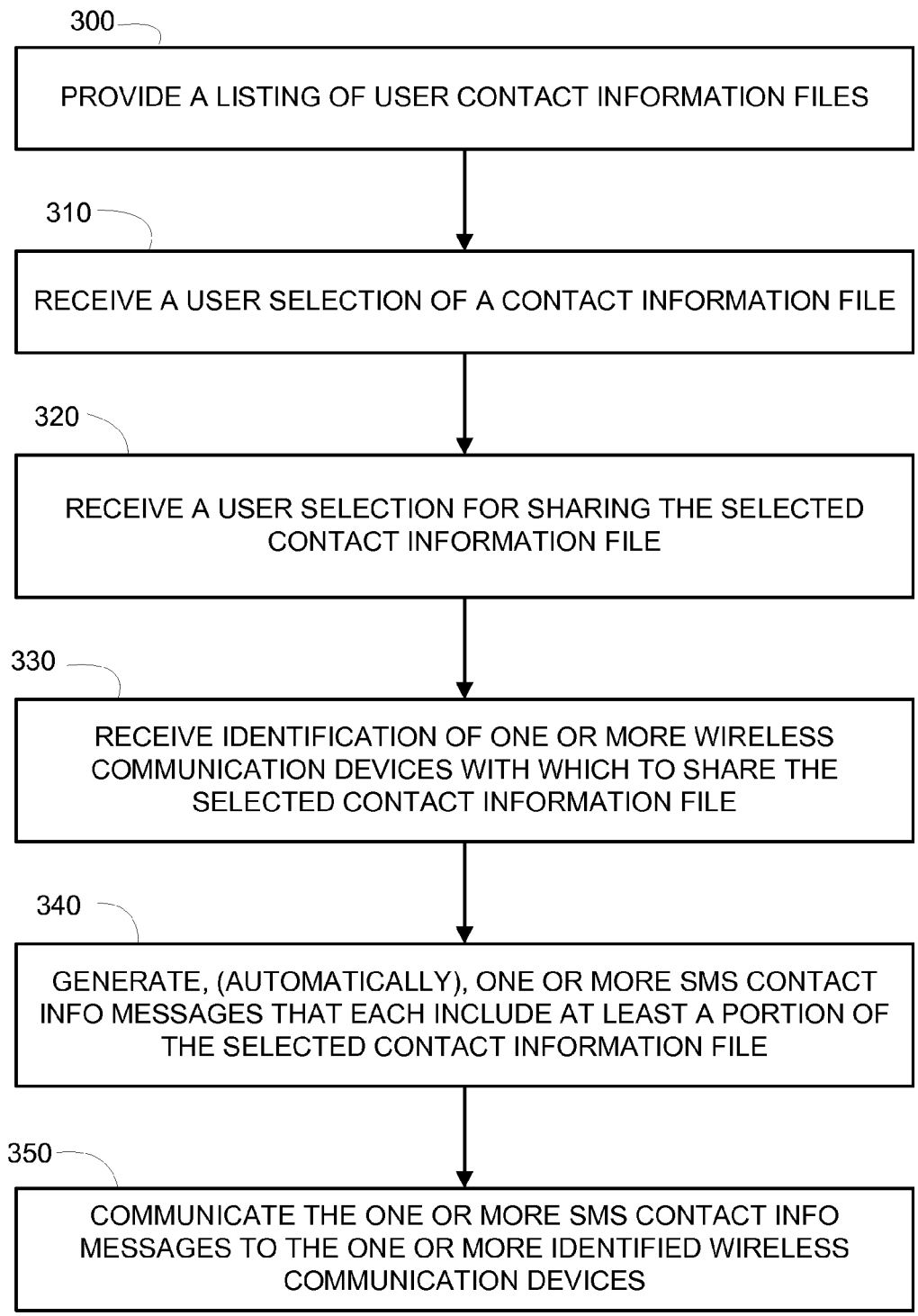
FIG. 5 is a flow diagram of a detailed method for sharing contact information between wireless communication devices using SMS, according to an aspect.

Referring now to FIG. 5, a flow diagram is provided of a detailed method for sharing contact information amongst wireless communication devices using Short Message Service (SMS) communication. At Event 300, a listing of user contact information files is provided on a wireless communication device. Typically, a user will access a standalone contact listing application or a communication application such as an SMS application, an email application or the like, to display a listing of user contact information files.

At Event 310, the wireless communication device receives a selection of a contact information file. In many aspects, selection of a contact information file may involve a user input, such as double-click of a selection key or a right-click mouse function or the like.

At Event 320, the wireless communication device receives a user selection indicating a request to share the selected contact information file. In many aspects, once a contact information file has been selected, an option menu may appear that includes an option for sharing the contact information file. At Event 330, the sharing device receives an identifier of one or more wireless communication devices to be recipients of the selected contact information file. In some aspects, receiving the identifiers of the share recipients may involve receiving a selection of the recipients from a displayed listing, e.g., a listing of other contacts in the contact listing database. In other aspects, receiving the identifier of the share recipients may involve receiving an input of wireless device identifiers, such as the telephone number(s) of the designated share recipients into an appropriate displayed share recipient input field.

At Event 340, once a contact information file has been selected for sharing and the share recipients have been identified, the wireless communication device generates one or more SMS contact information messages that each includes at least a portion of the selected contact information file. In some aspects, the wireless device generates the SMS contact information automatically, such as in aspects in which the device receives a selection of a contact information file, an indication to share the selected contact information file and a selection of share recipient devices. Thus, in some aspects, automatic generation of the SMS messages will be initiated by the contact listing application prompting the launch of the SMS module/application, where the forwarding of the contact information file and the designated share recipients will prompt the SMS module to automatically generate the SMS contact information messages. In alternate aspects, the one or more contact information messages may be manually generated and configured by the sharing device user.

The SMS contact information may be generated in a predetermined format that is operable to be recognizable as shared contact information by an SMS-receiving wireless communication device. For example, in some aspects, the SMS contact information files may be formatted in a personal data exchange format, such as vCard or the like, which is recognizable by the receiving device as contact information as opposed to a standard SMS message. In other aspects, the SMS contact information message(s) may be formatted to be recognizable by a wireless application platform, such as the BREW® platform or the like. In such aspects, an identifier or flag in the message header may be added to identify the message as including contact information, as opposed to being a conventional or a non-contact information bearing text message. It is noted that any format that provides for the designated receiving wireless devices to recognize the SMS message as including contact information suitable for storage in a contact listing database is within the confines of the present aspects.

At Event 350, once the SMS contact information messages have been generated, the messages are communicated via SMS protocol to one or more designated share recipient wireless communication devices.

Figure 6:
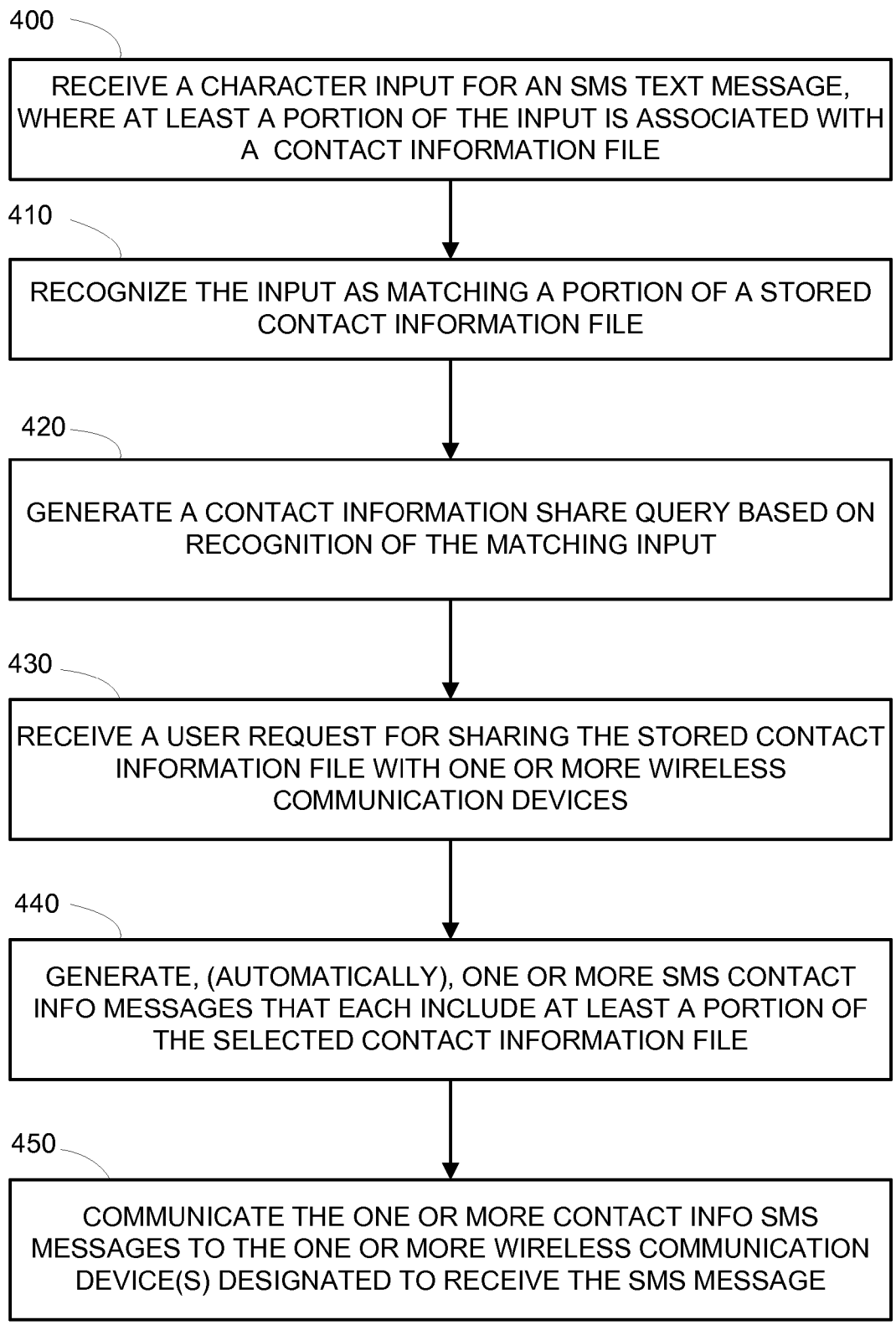
FIG. 6 is a flow diagram of a detailed method for sharing contact information between wireless communication devices using SMS, according to another aspect.

Referring to FIG. 6, another flow diagram is illustrated for a detailed method for sharing contact information between wireless communication devices using SMS communication, according to another aspect. In this aspect, the SMS application recognizes the input of text or data in a conventional SMS text message as being text/data that matches a portion of a stored contact information file, such as a contact entry, e.g. a name, a phone number, an email address, etc. Upon recognition of the contact entry, the SMS application prompts the user to determine if the user desires to share the related contact information file.

At Event 400, a wireless communication device receives input for an SMS text message that includes text/data associated with contact information stored in a contact information file. In this regard, a user is inputting, typically via keypad keystrokes, the text portion of a conventional SMS text message. A portion of the SMS text message may include information associated with the contact information file entry, such as a contact name, a contact home or business address, a contact telephone number, a contact email address or the like.

At Event 410, the wireless communication device recognizes the portion of the inputted data as matching an entry included within a stored contact information file. In some aspects, recognition involves comparing the inputted data to the data within the contact information files currently residing in the contact listing database.

At Event 420, based on the recognition, a contact information share query is generated and presented on the device. In some aspects, a window will be displayed asking the user if they desire to share the contact information file that is associated with the contact information entry. In other aspects, an audible sound, such as a computer generated voice, may be output by a speaker on the device.

In response to the query, if the user desires to share the contact information, the wireless device receives a user request at Event 430. In this instance, the wireless device does not need to receive identification information for the designated share recipient because the contact information will be shared with the same wireless device that is to receive the SMS text message.

At Event 440, the wireless communication device generates, automatically in some cases based on the logic within the respective SMS module, one or more SMS contact information messages that each include at least a portion of the selected contact information file formatted to recognizable as contact information by the recipient wireless device. In some aspect, automatic generation of the SMS contact information messages will be initiated by internally receiving the request to share from the SMS module and receiving the contact information file from the contact listing database. Further, in some aspects, the SMS contact information message may be a separate message from the original SMS text message that was being composed and that caused generation of the query. In other aspects, the SMS contact information message may be combined with the original SMS text message.

At Event 450, the wireless communication device communicates the SMS contact information message(s), via SMS protocol, to the wireless device that has been designated the recipient of the SMS text message.

Figure 7:
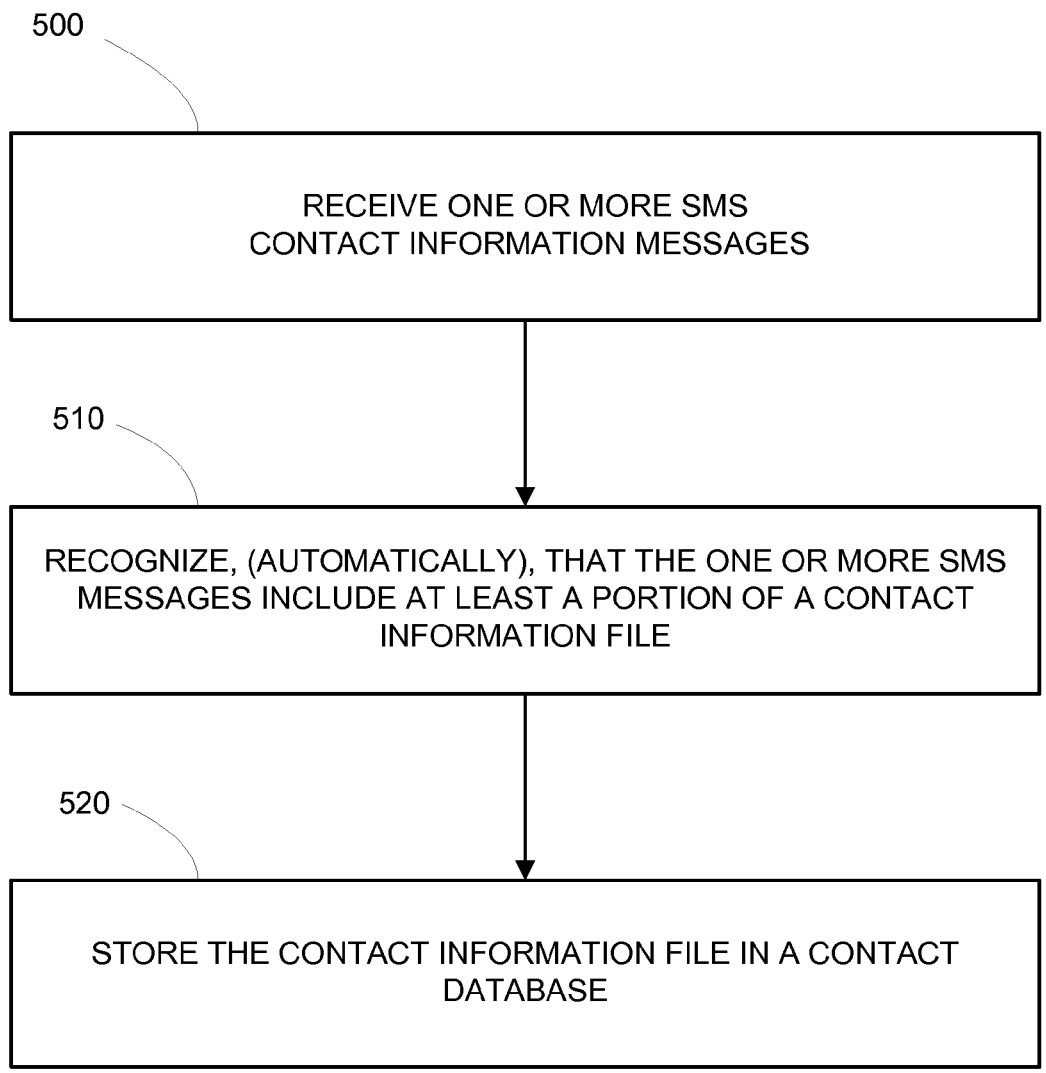
FIG. 7 is a flow diagram of a method for receiving shared contact information from a wireless communication device via SMS, according to another aspect.

Referring to FIG. 7, a flow diagram is provided for a method for receiving shared contact information from a wireless communication device using SMS communication, according to another aspect. At Event 500, a wireless communication device receives one or more SMS contact information messages that each includes at least a portion of a contact information file. As previously noted, SMS communication is limited in terms of the size of the message that can be communicated and, therefore, in many aspects, communicating contact information files will include segmenting the file prior to SMS communication, with each segmented portion being included in a separate SMS message.

At Event 510, the wireless communication device recognizes, typically automatically, that the one or more received SMS contact information messages include at least a portion of a contact information file. Recognition of the SMS contact information messages may involve recognizing the format or indicator implemented to designate the SMS message(s) as contact information SMS messages. The recognition action allows the contact-sharing SMS messages to be processed differently from conventional text SMS messages. Additionally, recognition of the SMS contact information message may initiate an option to save the contact info, as opposed to displaying the message. In the case of a plurality of related messages, e.g. a series of segmented SMS contact information messages, once the multiple SMS contact information messages are received and recognized as including contact information, the messages will be properly sequenced and aggregated to form the contact information file.

At Event 520, the contact information file is stored in a contact listing database. In some aspects, the contact information file may be stored automatically upon receipt and recognition, while in other aspects, the wireless device will provide the user with a storage request, which asks the user if they desire to store the received contact information file in their respective database.

The various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal. Additionally, in some aspects, the steps and/or actions of a method or algorithm may reside as one or any combination or set of instructions or codes on a machine-readable medium and/or computer readable medium, which may be embodied in a computer program product. Further, in some aspects, a processor may embody the described functions and methods in one or more modules.

Thus, present aspects provide for methods and devices for sharing contact information amongst wireless communication devices using Short Message Service (SMS) communication. SMS transfer of contact information may occur seamlessly, in that the sender automatically generates and sends a SMS message(s) that includes the contact information upon designating a contact for sharing and supplying a recipient identifier, such as the recipient phone number. On the recipient device end, receiving the contact information also occurs seamlessly, such that the contact information is automatically stored in the recipient's phone book or, in some aspects, automatically stored in the recipient's phone book based the recipient acquiescing the contact information. Since SMS communication is prevalent amongst the majority of wireless communication devices in the market, the present aspects provide for a greater degree of device penetration as compared to other methods that utilize other types of communication. Additionally, since SMS communication utilizes the wireless network, sharing of contact information is not limited in geographic range to close proximity sharing, but can be shared across the range of the wireless network.

While the foregoing disclosure shows illustrative aspects and/or embodiments, it should be noted that various changes and modifications could be made herein without departing from the scope of the described aspects and/or embodiments as defined by the appended claims. Furthermore, although elements of the described embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

What is claimed is:

1. A method for communicating shared contact information between mobile communication devices, comprising:
    receiving an input of text for a message within a text body of the message, wherein the text is plain text that is different from a hypertext link and that is without an embedded electronic address function;
    recognizing at least a portion of the text within the text body of the message as data corresponding to a stored contact information file;
    generating a contact information share query based on the recognizing of the data corresponding to the stored contact information file;
    receiving a user request for sharing the stored contact information file with one or more wireless communication devices;
    generating one or more Short Message Service (SMS) contact information messages that each include at least a portion of the contact information file in a format operable to be recognizable as shared contact information by an SMS-receiving wireless communication device;
    generating a SMS text message that includes the text, wherein the SMS text message is different from the one or more SMS contact information messages;
    communicating the one or more SMS contact information messages to the one or more wireless communication devices, and
    communicating the SMS text message separately from the one or more SMS contact information messages to the one or more wireless communication devices.

2. The method of claim 1, further comprising:
    providing a listing of user contact information files;
    receiving a user selection of a contact information file;
    receiving a user selection for sharing the selected contact information file with one or more wireless communication devices; and
    receiving a user selection of one or more wireless communication devices for sharing the selected contact information file.

3. The method of claim 1, further comprising receiving an identification of a recipient of the one or more SMS contact information messages, wherein communicating the one or more SMS contact information messages further comprises communicating the one or more SMS contact information messages to the identified recipient.

4. The method of claim 1, wherein receiving the text input further comprises receiving data corresponding to a contact file entry, wherein the entry is chosen from the group consisting of a contact name, a contact telephone number, a contact street address, and a contact email address.

5. The method of claim 1, wherein generating one or more SMS contact information messages further comprises automatically generating the one or more SMS contact information messages upon a received selection of the contact information file and the one or more wireless communications devices.

6. The method of claim 1, further comprising identifying the SMS text message such that a wireless communication device that receives the one or more SMS contact information messages automatically recognizes that the one or more SMS contact information messages include at least a portion of the contact information file.

7. The method of claim 1, further comprising identifying a portion of the text input such that a user of a wireless device receiving the one or more SMS contact information messages recognizes that the one or more SMS contact information messages provide for acquiring the contact information file.

8. The method of claim 7, wherein the identifying further comprises embedding a link in the text input, wherein the link is operable to initiate execution to store the contact information file corresponding to the one or more SMS contact information messages in a contact listing database of the one or more wireless communication devices.

9. The method of claim 8, wherein the link corresponds to either a network resource for retrieving at least a part of the contact information file or a previous SMS contact information message for retrieving at least a part of the contact information file.

10. The method of claim 1, wherein generating one or more SMS contact information messages that each include at least a portion of a contact information file in a format operable further defines the format as a personal data exchange file format.

11. The method of claim 1, wherein generating one or more SMS contact information messages that each include at least a portion of a contact information file in a format operable further defines the format as a format executable by a wireless communication device-application development platform.

12. The method of claim 1, wherein generating one or more SMS contact information messages that include at least a portion of a contact information file further comprises generating two or more SMS contact information messages that each include a separate portion of the contact information file.

13. The method of claim 12, further comprises identifying each of the two or more SMS contact information messages to associate the two or more SMS contact messages and to allow for the contact information file to be assembled at the one or more wireless communication devices.

14. The method of claim 1, wherein the recognizing comprises matching the portion of the text with an entry included within the stored contact information file.

15. At least one processor configured for communicating shared contact information between mobile communication devices, comprising:
    a first module for receiving an input of text for a message within a text body of the message, wherein the text is plain text that is different from a hypertext link and that is without an embedded electronic address function;

a second module for recognizing at least a portion of the text within the text body of the message as data corresponding to a stored contact information file;

a third module for generating a contact information share query based on the recognizing of the data corresponding to the stored contact information file;

a fourth module for receiving a user request for sharing the stored contact information file with one or more wireless communication devices;

a fifth module for generating one or more Short Message Service (SMS) contact information messages that each include at least a portion of the contact information file in a format operable to be recognizable as shared contact information by an SMS-receiving wireless communication device;

a sixth module for generating a SMS text message that includes the text, wherein the SMS text message is different from the one or more SMS contact information messages;

a seventh module for communicating the one or more SMS contact information messages to the one or more wireless communication devices; and an eighth module for communicating the SMS text message separately from the one or more SMS contact information messages to the one or more wireless communication devices.

16. The processor of claim 15, further comprising:

a ninth module for identifying a portion of the text input such that a user of a wireless device receiving the one or more SMS contact information messages recognizes that the one or more SMS contact information messages provide for acquiring the contact information file;

wherein the identifying further comprises embedding a link in the text input, wherein the link is operable to initiate execution to store the contact information file corresponding to the one or more SMS contact information messages in a contact listing database of the one or more wireless communication devices; and wherein the link corresponds to either a network resource for retrieving at least a part of the contact information file or a previous SMS contact information message for retrieving at least a part of the contact information file.

17. A computer program product, encoded on a non-transitory computer-readable medium comprising:

a first set of codes for causing a computer to receive an input of text for a message within a text body of the message, wherein the text is plain text that is different from a hypertext link and that is without an embedded electronic address function;

a second set of codes for causing the computer to recognize at least a portion of the text within the text body of the message as data corresponding to a stored contact information file;

a third set of codes for causing the computer to generate a contact information share query based on the recognizing of the data corresponding to the stored contact information file;

a fourth set of codes for causing the computer to receive a user request for sharing the stored contact information file with one or more wireless communication devices;

a fifth set of codes for causing the computer to generate one or more Short Message Service (SMS) contact information messages that each include at least a portion of the contact information file in a format operable to be recognizable as shared contact information by an SMS-receiving wireless communication device;

a sixth set of codes for causing the computer to generate a SMS text message that includes the text, wherein the SMS text message is different from the one or more SMS contact information messages;

a seventh set of codes for causing the computer to communicate the one or more SMS contact information messages to the one or more wireless communication devices; and an eighth set of codes for causing the computer to communicate the SMS text message separately from the one or more SMS contact information messages to the one or more wireless communication devices.

18. The computer program product of claim 17, further comprising:

a ninth set of codes for causing the computer to identify a portion of the text input such that a user of a wireless device receiving the one or more SMS contact information messages recognizes that the one or more SMS contact information messages provide for acquiring the contact information file;

wherein the identifying of the portion of the text input further comprises embedding a link in the text input, wherein the link is operable to initiate execution to store the contact information file corresponding to the one or more SMS contact information messages in a contact listing database of the one or more wireless communication devices; and wherein the link corresponds to either a network resource for retrieving at least a part of the contact information file or a previous SMS contact information message for retrieving at least a part of the contact information file.

19. A wireless communication device, comprising:

means for receiving an input of text for a message within a text body of the message, wherein the text is plain text that is different from a hypertext link and that is without an embedded electronic address function;

means for recognizing at least a portion of the text within the text body of the message as data corresponding to a stored contact information file;

means for generating a contact information share query based on the recognizing of the data corresponding to the stored contact information file;

means for receiving a user request for sharing the stored contact information file with one or more wireless communication devices;

means for generating one or more Short Message Service (SMS) contact information messages that each include at least a portion of the contact information file in a format operable to be recognizable as shared contact information by an SMS-receiving wireless communication device;

means for generating a SMS text message that includes the text, wherein the SMS text message is different from the one or more SMS contact information messages;

means for communicating the one or more SMS contact information messages to the one or more wireless communication devices; and means for communicating the SMS text message separately from the one or more SMS contact information messages to the one or more wireless communication devices.

20. The wireless communication device of claim 19, further comprising:

means for identifying a portion of the text input such that a user of a wireless device receiving the one or more SMS contact information messages recognizes that the one or more SMS contact information messages provide for acquiring the contact information file;

wherein the identifying further comprises embedding a link in the text input, wherein the link is operable to initiate execution to store the contact information file corresponding to the one or more SMS contact information messages in a contact listing database of the one or more wireless communication devices; and wherein the link corresponds to either a network resource for retrieving at least a part of the contact information file or a previous SMS contact information message for retrieving at least a part of the contact information file.

21. A wireless communication device, comprising:

a computer platform including a processor and a memory;

a Short Message Service module stored in the memory and executable by the processor, wherein the SMS application is operable to:

receive an input of text for a message within a text body of the message, wherein the text is plain text that is different from a hypertext link and that is without an embedded electronic address function;

recognize at least a portion of the text within the text body of the message as data corresponding to a stored contact information file;

generate a contact information share query based on the recognizing of the data corresponding to the stored contact information file;

receive a user request for sharing the stored contact information file with one or more wireless communication devices;

generate one or more SMS contact information messages that each include at least a portion of the contact information file in a format operable to be recognizable as shared contact information by an SMS-receiving wireless communication device;

generate a SMS text message that includes the text, wherein the SMS text message is different from the one or more SMS contact information messages; and a communication module operable to communicate the one or more SMS contact information messages to the one or more wireless communication devices and to communicate the SMS text message separately from the one or more SMS contact information messages to the one or more wireless communication devices.

22. The wireless communication device of claim 21, wherein the data corresponding to the stored contact information file further comprises an entry chosen from the group consisting of a contact name, a contact telephone number, a contact street address, and a contact email address.

23. The wireless communication device of claim 21, wherein the SMS module is further operable to identify a portion of the text input such that a user of a wireless device receiving the one or more SMS contact information messages recognizes that the one or more SMS contact information messages provide for acquiring the contact information file.

24. The wireless communication device of claim 23, wherein the SMS module is further operable to embed a link in the text input, wherein the link is operable to initiate execution to store the contact information file corresponding to the one or more SMS contact information messages in a receiving wireless communication device contact listing database.

25. The wireless communication device of claim 24, wherein the link corresponds to either a network resource for retrieving at least a part of the contact information file or a previous SMS contact information message for retrieving at least a part of the contact information file.

26. The wireless communication device of claim 21, wherein the SMS module is further operable to identify the one or more SMS contact information messages such that a wireless communication device that receives the one or more SMS contact information message automatically recognizes that the one or more SMS contact information messages include at least a portion of the contact information file.

27. The wireless communication device of claim 21, wherein the format is further defined as a personal data exchange file format.

28. The wireless communication device of claim 21, wherein the format is further defined as a format executable by a wireless communication device-application development platform.

29. The wireless communication device of claim 21, wherein the SMS module further comprises a contact file segmentor operable to segment the contact information file into two or more segments, wherein a respective one of the two or more segments is included in a respective one of two or more SMS contact information messages.

30. The wireless communication device of claim 29, wherein the SMS module is further operable to identify each of the two or more SMS contact information messages to associate the two or more SMS contact messages and to allow for the contact information file to be assembled at the one or more wireless communication devices.

31. The wireless communication device of claim 21, wherein the SMS application is further operable to match the portion of the text with an entry included within the stored contact information file.

\* \* \* \* \*